(12) United States Patent
Ueno

(10) Patent No.: US 6,249,307 B1
(45) Date of Patent: Jun. 19, 2001

(54) IMAGE FORMING APPARATUS USING PLURAL BEAM SCANNING

(75) Inventor: Toshiyuki Ueno, Kawasaki (JP)

(73) Assignees: Toshiba TEC Kabushiki Kaisha, Tokyo; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/470,884

(22) Filed: Dec. 22, 1999

(30) Foreign Application Priority Data

Dec. 22, 1998 (JP) .................................................. 10-365611

(51) Int. Cl.[7] ........................................................ B41J 2/47
(52) U.S. Cl. ............................................ 347/234; 347/237
(58) Field of Search ..................................... 347/233, 234, 347/235, 236, 237, 250, 248, 253, 257; 250/204, 205, 559.29, 559.3, 208.5

(56) References Cited

U.S. PATENT DOCUMENTS 5,264,871 * 11/1993 Tsukada ................................ 347/253
5,892,533 * 4/1999 Tanimoto et al. .................... 347/257

FOREIGN PATENT DOCUMENTS 10-76704   3/1998 (JP) .
11-95142   4/1999 (JP) .

* cited by examiner

Primary Examiner—N. Le
Assistant Examiner—Hai C. Pham
(74) Attorney, Agent, or Firm—Foley & Lardner

(57) ABSTRACT

The timing control of optical beams (i.e., the control of the beam positions in the main scanning direction) and the beam amount control of the optical beams for position control (i.e., the control of the beam positions in the sub-scanning direction) are performed independently of the control of the amount of optical beam actually used for printing. Accordingly, the timing control of optical beams and the beam amount control of the optical beams for position control can be performed without reference to the characteristic change which the photosensitive drum may undergo with time. Even when the powers (second powers) of the optical beams incident on the photosensitive drum increase due to the characteristics change of the photosensitive drum or for some other reason, this power increase does not adversely affect the timing control of optical beams, nor does it vary the powers (first powers) of the optical beams which are incident on the optical beam sensor at the time of position control. Since the first powers remain constant at all times, the sensing signals output from the optical beam sensor do not vary undesirably. Consequently, the timing control and position control of optical beams can be performed accurately.

7 Claims, 4 Drawing Sheets

IMAGE FORMING APPARATUS USING PLURAL BEAM SCANNING

BACKGROUND OF THE INVENTION

The present invention relates to an image forming apparatus, such as a digital copying machine or a laser printer, which employs a beam scanning apparatus. The beam scanning apparatus forms one electrostatic latent image on a photosensitive drum by exposure by scanning a plurality of optical beams over the photosensitive drum at one time.

In recent years, digital copying machines of various types have been developed, which execute image formation by the scanning of optical beams and by use of an electrophotography process.

A digital copying machine that has been developed very recently is designed to speed up the image formation by adopting a multi-beam system, i.e., a system which emits a plurality of optical beams and scan them over a photosensitive drum along a plurality of lines at one time.

The multi-beam digital copying machine is provided with an optical system unit serving as an optical beam scanning apparatus. This optical system unit is mainly made up of: a plurality of semiconductor laser oscillators (hereinafter referred to as laser oscillators) which emits a plurality of optical beams; a rotatable multifaceted mirror, such as a polygon mirror, for reflecting the optical beams emitted by the laser oscillators toward a photosensitive drum and scanning them over the photosensitive drum; and optical elements, such as a collimator lens and an f-θ lens.

An image forming apparatus employing an optical beam scanning apparatus is proposed in a Jpn. Pat. Appln. KOKAI Publication No. 10-76704 (the contents of which are identical to those of Japanese Patent Application No. 8-233198). According to this publication, an optical beam position sensor produces a sensor output, and this sensor output is used for the positional control of optical beams.

In this type of image forming apparatus, the control target value of the power of the optical beam emitted from each laser oscillator (i.e., output laser power) is adjusted in such a manner that the power of an optical beam incident on both the photosensitive drum and optical beam position sensor takes a predetermined value (e.g., 300 $\mu$W) at the time of shipment. Owing to this, an optical sensing signal is output from the optical beam position sensor, and a desirable electrostatic latent image can be formed on the photosensitive drum.

Although the photosensitive drum may vary in characteristic with time, an adequate electrostatic latent image must be formed at all times. To enable this, the control target value of the power of the optical beam emitted from each laser oscillator can be increased by a serviceperson. If this is done, however, it is likely that the power of the optical beam incident on both the photosensitive drum and the optical beam position sensor will exceed the predetermined power (e.g., 300 $\mu$W) (the power will be 400 $\mu$W, for example). Since this has adverse effects on the sensing output signal from the optical beam sensor, it will not be possible to perform accurate control (e.g., accurate positional control).

To put it differently, the amount of light sensed by the optical beam position sensor may vary, depending upon the characteristic change which the photosensitive drum may undergo with time. In some cases, the optical beam position sensor produces an error sensing output, which would result in a failure of control, e.g., accurate positional control.

BRIEF SUMMARY OF THE INVENTION

An object of the present invention is to provide an image forming apparatus which is capable of keeping the sensing output signal from the optical beam position sensor at a constant value even if the characteristic change the image bearer may undergo with time results in an increase in the power of the optical beam emitted from each laser oscillator, and which therefore enables accurate beam control.

According to the present invention, there is provided an image forming apparatus which scans a plurality of optical beams over an image bearer to form an image on the image bearer by exposure and which comprises:

optical beam generating means for outputting the optical beams;

scanning means for scanning the optical beams over the image bearer by reflecting the optical beams emitted from the optical beam generating means toward the image bearer;

optical beam sensing means, arranged near a beam-scanned region of the image bearer, for outputting a sensing signal corresponding to timings at which the scanning means scans the optical beams in a scanning direction, a sensing signal corresponding to power of each of the optical beams, and a sensing signal corresponding to a position determined in a direction orthogonal to the scanning direction;

changing means for changing power of each of the optical beams emitted from the optical beam generating means, independently of one another;

first setting means, operating when the timings at which the scanning means scans the optical beams in the scanning direction and the position determined in the direction orthogonal to the scanning direction are adjusted, for causing the changing means to change the power of each of the optical beams output from the optical beam generating means independently of one another on the basis of the sensing signal corresponding to the power of each of the optical beams from the optical beam sensing means, and for setting the power of each of the optical beams incident on the optical beam sensing means to be first power; and second setting means, operating when the image is formed on the image bearer, for causing the changing means to change the power of each of the optical beams output from the optical beam generating means independently of one another on the basis of the sensing signal corresponding to the power of each of the optical beams from the optical beam sensing means, and for setting the power of each of the optical beams incident on the optical beam sensing means to be second power, which is different in level from the first power.

According to the present invention, there is provided another image forming apparatus which scans a plurality of optical beams over an image bearer to form an image on the image bearer by exposure and which comprises:

optical beam generating means for outputting the optical beams;

scanning means for scanning the image bearer with the optical beams by reflecting the optical beams emitted from the optical beam generating means toward the image bearer;

optical beam sensing means, arranged near a beam-scanned region of the image bearer, for outputting a sensing signal corresponding to timings at which the scanning means scans the optical beams in a scanning direction, a sensing signal corresponding to power of each of the optical beams, and a sensing signal corresponding to a position determined in a direction orthogonal to the scanning direction;

changing means for changing power of each of the optical beams emitted from the optical beam generating means, independently of one another;

first setting means for causing the changing means to change the power of each of the optical beams output from the optical beam generating means independently of one another on the basis of the sensing signal corresponding to the power of each of the optical beams from the optical beam sensing means, and for setting the power of each of the optical beams incident on the optical beam sensing means to be first power;

adjusting means, operating when the first power is set by the first setting means, for adjusting the timings at which the scanning means scans the optical beams in the scanning direction and the position determined in the direction orthogonal to the scanning direction, on the basis of the sensing signal corresponding to the timings at which the scanning means scans the optical beams in the scanning direction and the sensing signal corresponding to the position determined in the direction orthogonal to the scanning direction; and second setting means, operating after adjustment is made by the adjusting means, for causing the changing means to change the power of each of the optical beams output from the optical beam generating means independently of one another on the basis of the sensing signal corresponding to the power of each of the optical beams from the optical beam sensing means, and for setting the power of each of the optical beams incident on the image bearer to be second power, which is different in level from the first power.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a flowchart for illustrating how beam control processing is executed when the power supply is turned on.

FIG. 4 is a flowchart for illustrating how beam control processing is executed when a print key is depressed.

DETAILED DESCRIPTION OF THE INVENTION

An image forming apparatus according to one embodiment of the present invention will now be described with reference to the accompanying drawings.

Figure 1:
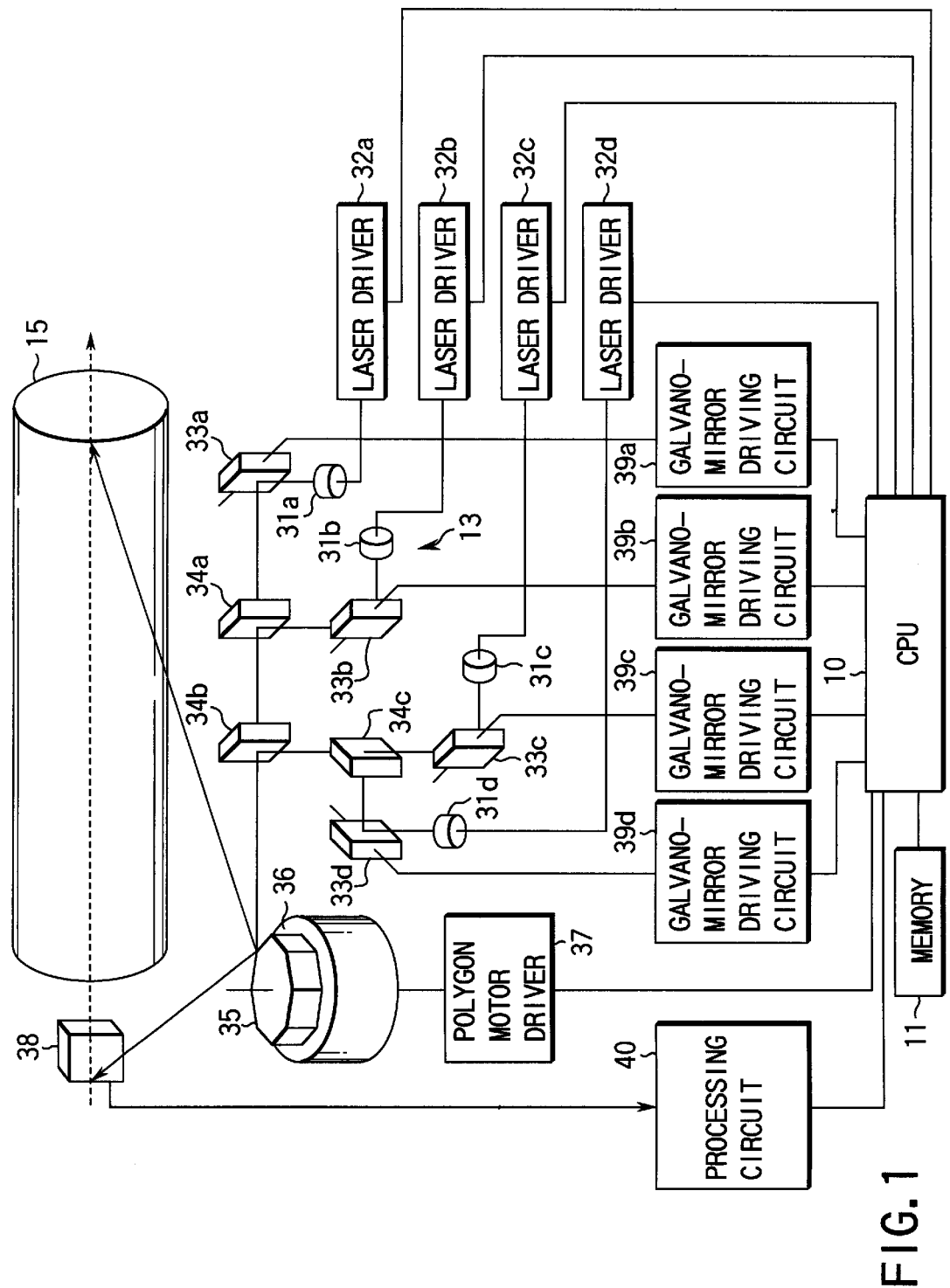
FIG. 1 shows the positional relationships between an optical system unit and a photosensitive drum, which are incorporated in a digital copying machine, i.e., an image forming apparatus according to one embodiment of the present invention.

FIG. 1 shows the positional relationships between an optical system unit 13 and a photosensitive drum 15, which are incorporated in a digital copying machine, i.e., the image forming apparatus according to one embodiment of the present invention.

The optical system unit 13 incorporates a plurality of semiconductor laser oscillators, e.g., four semiconductor laser oscillators 31a, 31b, 31c and 31d (hereinafter referred to as laser oscillators). The optical beams a to d emitted from the laser oscillators 31a to 31d are simultaneously scanned along the respective scanning lines, for image formation. By executing the scanning operation in this manner, high-speed image formation is enabled with no need to excessively increase the rotating speed of a polygon mirror 35.

The laser oscillator 31a is driven by a laser driver 32a. The optical beam a emitted from the laser oscillator 31a passes through a collimator lens (not shown), and is then incident on a galvano-mirror 33a, which serves as a beam path-changing means. The optical beam a reflected by the galvano-mirror 33a passes through both half-mirrors 34a and 34b, and is then incident on the polygon mirror 35, which serves as a multifaceted mirror.

The polygon mirror 35 is rotated at a constant speed by a polygon motor 36, which is driven based on a polygon motor driver 37. The reflected light from the polygon mirror 35 is scanned in one direction at an angular velocity determined by the rotating speed of the polygon motor 36. The optical beam a scanned by the polygon mirror 35 passes through an f-θ lens (not shown). Owing to the f-θ characteristic of the f-θ lens, the photosensitive drum 15 and the light-receiving surface of an optical beam position sensor 38 (i.e., an optical beam position sensing means) are irradiated with the beam at a constant speed.

The laser oscillator 31b is driven by a laser driver 32b. The optical beam b emitted from the laser oscillator 31b passes through a collimator lens (not shown), is reflected by a galvano-mirror 33b, and is then reflected by the half-mirror 34a. The reflected light from the half mirror 34a passes through the half-mirror 34b and is then incident on the polygon mirror 35. Like the optical beam a emitted from the laser oscillator 31a, the optical beam k scanned by the polygon mirror 35 passes through the f-θ lens (not shown), and the photosensitive drum 15 and the light-receiving surface of the optical beam position sensor 38 are irradiated with the beam at a constant speed.

The laser oscillator 31c is driven by a laser driver 32c. The optical beam c emitted from the laser oscillator 31c passes through a collimator lens (not shown), is reflected by a galvano-mirror 33c, passes through a half-mirror 34c, is reflected by the half-mirror 34b, and is then incident on the polygon mirror 35. Like the optical beams a and b emitted from the laser oscillators 31a and 31b, the optical beam c scanned by the polygon mirror 35 passes through the f-θ lens (not shown), and the photosensitive drum 15 and the light-receiving surface of the optical beam position sensor 38 are irradiated with the beam at a constant speed.

The laser oscillator 31d is driven by a laser driver 32d. The optical beam d emitted from the laser oscillator 31d passes through a collimator lens (not shown), is reflected by a galvano-mirror 33d, is reflected by the half-mirror 34c, is reflected by the half-mirror 34b, and is then incident on the polygon mirror 35. Like the optical beams a, b and c emitted from the laser oscillators 31a, 31b and 31c, the optical beam d scanned by the polygon mirror 35 passes through the f-θ lens (not shown), and the photosensitive drum 15 and the light-receiving surface of the optical beam position sensor 38 are irradiated with the beam at a constant speed.

In the manner described above, the optical beams a to d emitted from the laser oscillators 31a, 31b, 31c and 31d are synthesized together by the half-mirrors 34a, 34b and 34c, and make for the polygon mirror 35.

Accordingly, the four optical beams a to d can be simultaneously scanned over the photosensitive drum 15. In comparison with a single beam, the four optical beams a to d enable an image to be recorded four times faster, given that the rotating speed of the polygon mirror 35 is constant.

The galvano-mirrors 33a, 33b, 33c and 33d are employed to adjust (control) the positional relationships among the optical beams in the sub-scanning direction. Galvano-mirror driving circuits 39a, 39b, 39c and 39d are connected to the galvano-mirrors 33a, 33b, 33c and 33d, respectively.

The optical beam position sensor 38 is employed to sense the passage positions and timings of the four optical beams a to d. The optical beam position sensor 38 is arranged close to one end of the photosensitive drum 15 so that the light-receiving surface of the optical beam position sensor 38 can be regarded as optically equivalent to the surface of the photosensitive drum 15. That is, the imaginary distance between the polygon mirror 35 and the light-receiving surface of the optical beam position sensor 38 is equal to the imaginary distance between the polygon mirror 35 and the surface of the photosensitive drum 15.

Owing to this structure described above, the optical beams a to d that are scanned over the surface of the photosensitive drum 15 by means of the polygon mirror 35 and the f-θ lens and the optical beams a to d that are scanned over the light-receiving surface of the optical beam position sensor 38 are considered identical to each other.

The optical beam position sensor 38 will now be described in detail.

Figure 2:
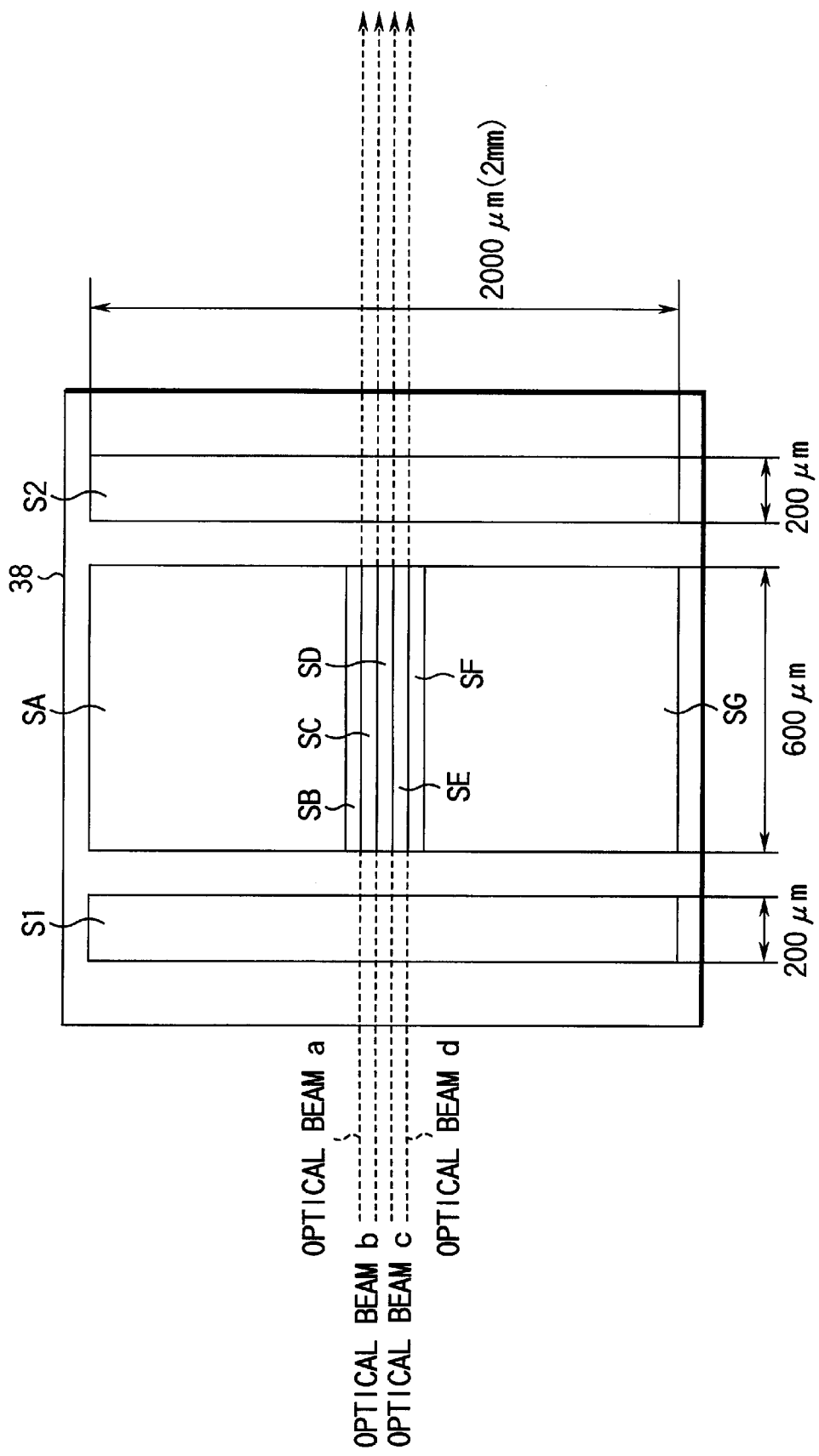
FIG. 2 shows the relationships between the structure of an optical beam position sensor and the scanning direction of optical beams.

FIG. 2 shows the relationships between the structure of the optical beam position sensor 38 and the scanning direction of optical beams a to d. The optical beams a to d emitted from the four semiconductor laser oscillators 31a, 31b, 31c and 31d are scanned from left to right in accordance with the rotation of the polygon mirror 35, and pass across the optical beam position sensor 38.

The optical beam position sensor 38 comprises sensor patterns (light-receiving patterns) S1 and S2 which are elongated in one direction, and sensor patterns (light-receiving patterns) SA, SB, SC, SD, SE, SF and SG which are sandwiched by the sensor patterns S1 and S2.

As shown in FIG. 2, the sensor patterns S1 and S2 are elongated in the direction orthogonal to the scanning direction of optical beams a to d in such a manner that the optical beams a to d never fail to pass across the sensor patterns S1 and S2, without reference to the positions of the galvano-mirrors 33a to 33d.

As shown in FIG. 2, the sensor patterns SA to SG are arranged between the sensor patterns S1 and S2, and a very small gap is defined between sensor patterns SB and SC, between sensor patterns SC and SD, between sensor patterns SD and SE, and between sensor patterns SE and SF.

A processing circuit 40 is connected to the optical beam position sensor 38 so as to process the sensing outputs produced from the sensor 38.

The processing circuit 40 is made up of: first and second amplifiers; first to fourth differential amplifiers; a selection circuit; an integrator; and an A/D converter.

The first amplifier amplifies an output of sensor pattern SA, and the second amplifier amplifies an output of sensor pattern SG. The first differential amplifier subtracts an output of sensor pattern SC from an output of sensor pattern SB and amplifies the resultant difference. The second differential amplifier subtracts an output of sensor pattern SD from an output of sensor pattern SC and amplifies the resultant difference. The third differential amplifier subtracts an output of sensor pattern SE from an output of sensor pattern SD and amplifies the resultant difference. The fourth differential amplifier subtracts an output of sensor pattern SF from an output of sensor pattern SE and amplifies the resultant difference.

The selection circuit selectively supplies the outputs of the first and second amplifiers and the outputs of the first to fourth differential amplifiers to the integrator in accordance with a selection signal issued from CPU 10. The integrator is reset by an output of sensor pattern S1 and integrates an output supplied from the selection circuit. The integrated output is supplied to an AID converter. The A/D converter is triggered by an output of sensor pattern S2 and converts an analog signal into a digital signal, and supplies the digital signal to the CPU 10. The analog signal is specifically an integration result produced from the integrator; it is a sensing signal representing the passage position of an optical beam.

The CPU 10 controls the entire system.

For example, the CPU 10 controls the laser drivers 32a to 32d, the galvano-mirror driving circuits 39a to 39d, and other structural elements. The CPU 10 controls those structural elements on the basis of an output from the processing circuit 40.

More specifically, the CPU 10 performs the following control on the basis of an output from the processing circuit 40, i.e., a sensing signal output from the optical beam position sensor 38.

The control performed by the CPU 10 includes: the control of the galvano-mirrors 33a, 33b, 33c and 33d corresponding to optical beams a to d (the galvano-mirrors are controlled for adjusting the image forming position in the sub-scanning direction); the control of the powers (intensities) of the optical beams a to d emitted from the laser oscillators 31a, 31b, 31c and 31d; and the control of the emission timings (the emission timings are controlled for adjusting the image formation position in the main scanning direction).

A memory 11 is connected to the CPU 10. A control program is stored in the memory 11. The memory stores first and second control values. The first control values correspond to the powers which the optical beams a to d from the laser oscillators 31a to 31d must have when position control using the optical beam position sensor 38 is performed. The second control values correspond to the powers which the optical beams a to d from the laser oscillators 31a to 31d must have when an electrostatic latent image is written (produced) on a photosensitive drum 15 (the second control values are power target values for printing).

The powers (second powers) which the optical beams a to d incident on the photosensitive drum 15 have when an electrostatic latent image is written (produced) on the photosensitive drum 15, are adjusted in such a manner as to gradually increase in accordance with the characteristic change the photosensitive drum 15 may undergo with time.

To be more specific, the second control values, which determine the powers of the optical beams a to d emitted from the laser oscillators, can be adjusted by a serviceperson, so that an optimal electrostatic latent image can be formed despite the characteristic change of the photosensitive drum 15.

On the other hand, the powers (first powers) which the optical beams a to d must have on the optical beam position sensor 38 when position control using the optical beam position sensor 38 is performed, are fixedly set at a predetermined value (300 μW), and this value is fixed without reference to the characteristic change of the photosensitive drum 15.

As described above, the first powers are constant and do not vary in accordance with a change in the second powers, which are changed in accordance with the characteristic change of the photosensitive drum 15.

Since the first and second powers are determined as above, the sensing output signals from the optical beam position sensor 38 do not vary. Accordingly, the control operation for controlling accurate position control or the like can be performed with high accuracy.

A detailed structure related to the above control is described in U.S. patent application Ser. No. 09/150,705.

Figures 3, 4:
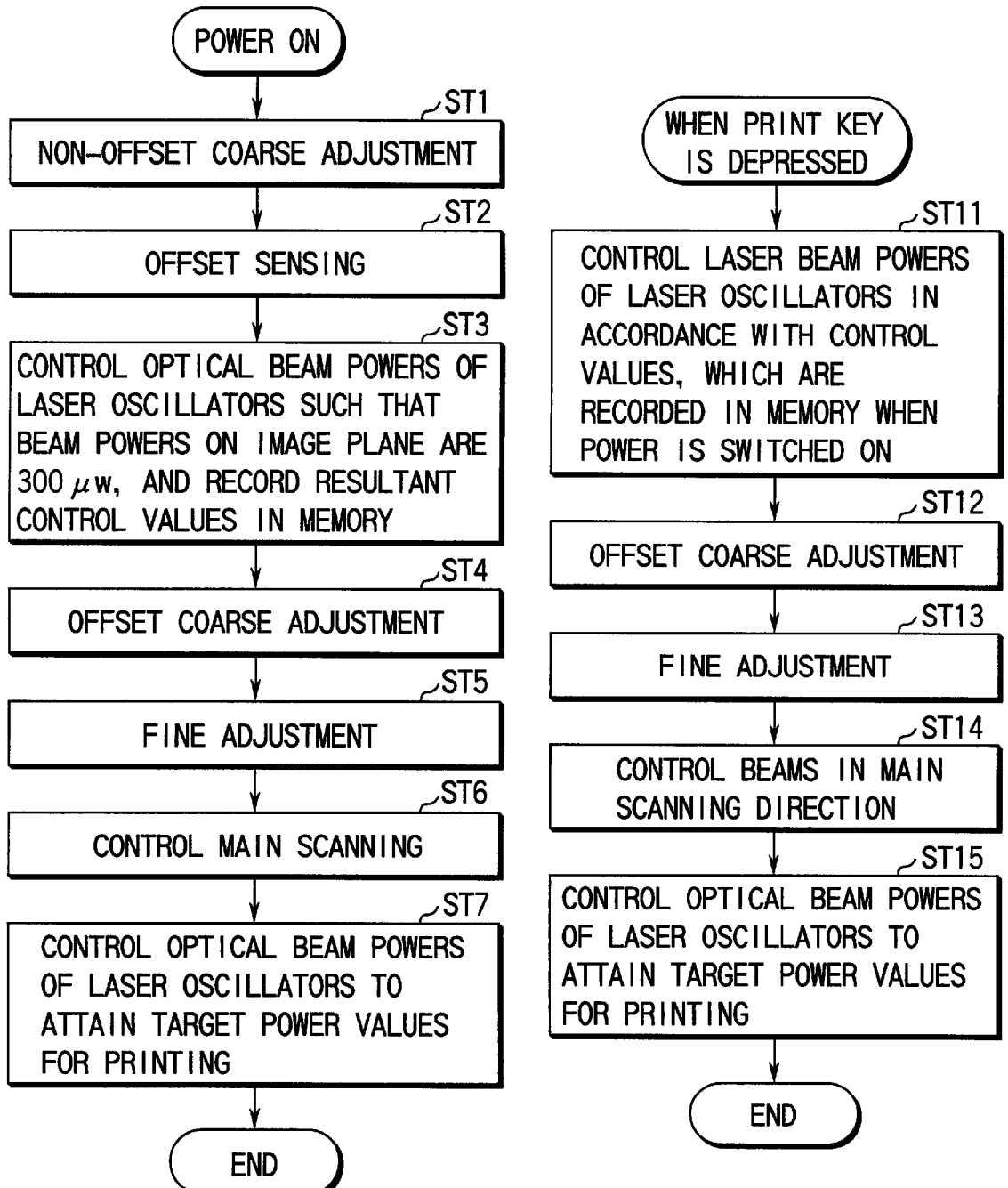

A description will now be given with reference to the flowchart shown in FIG. 3 as to how beam control processing is performed by the above structure when the power supply switch is turned on.

First, the CPU 10 drives the galvano-mirrors 33a, 33b, 33c and 33d, with the optical beams a to d emitted from the corresponding laser oscillators 31a to 31d. By driving the galvano-mirrors 33a to 33d in this way, the fully optical beams a to d are confined to the regions between sensor patterns SB, SC, SD, SE and SF. In this manner, non-offset coarse adjustment (i.e., coarse adjustment that leaves offsets out of consideration) is made with respect to the four optical beams a to d (STEP ST1).

More specifically, the CPU 10 adjusts the angle of galvano-mirror 33a in such a manner that optical beam a is radiated to a position where the first differential amplifier, which subtracts the output of sensor pattern SC from the output of sensor pattern SB, can produce an output. The CPU 10 adjusts the angle of galvano-mirror 33b in such a manner that optical beam b is radiated to a position where the second differential amplifier, which subtracts the output of sensor pattern SD from the output of sensor pattern SC, can produce an output. The CPU 10 adjusts the angle of galvano-mirror 33c in such a manner that optical beam c is radiated to a position where the third differential amplifier, which subtracts the output of sensor pattern SE from the output of sensor pattern SD, can produce an output. The CPU 10 adjusts the angle of galvano-mirror 33d in such a manner that optical beam d is radiated to a position where the fourth differential amplifier, which subtracts the output of sensor pattern SF from the output of sensor pattern SE, can produce an output.

In consequence, optical beam a is confined to the region between sensor patterns SB and SC, optical beam b to the region between sensor patterns SC and SD, optical beam c to the region between sensor patterns SD and SE, and optical beam d to the region between sensor patterns SE and SF.

The driving values with which the galvanometers 33a to 33d are driven when the optical beams a to d are confined to the regions between sensor patterns SB, SC, SD, SE and SF, are recorded in the memory 11 as offsets, under the control by the CPU 10 (Step ST2).

On the basis of the sensing signals supplied from the sensing patterns SA to SG of the optical beam position sensor 38, the CPU 10 controls the powers of the optical beams a to d emitted from the laser oscillators 31a to 31d in such a manner that the beam powers at the optical beam position sensor 38 are 300 μW at all times (Step ST3).

In addition, the CPU 10 records first control values in the memory 11 (Step ST3). The first control values correspond to the powers which the optical beams a to d from the controlled laser oscillators 31a to 31d have.

Further, the CPU 10 executes offset coarse adjustment (i.e., coarse adjustment that take offsets into consideration) so as to confine the four optical beams a to d to the regions between sensor patterns SB, SC, SD, SE and SF (Step ST4).

On the basis of the driving values recorded in the memory 11 in step ST2, the galvano-mirrors 33a to 33d are driven to vary their angles. As a result, the four optical beams a to d are confined to the regions between sensor patterns SB, SC, SD, SE and SF.

Thereafter, the CPU 10 executes fine adjustment (i.e., the control of the beam positions in the sub-scanning direction) so as to confine the four beams to the four regions between sensor patterns SB, SC, SD, SE and SF, respectively (Step ST5).

To be more specific, the CPU 10 makes fine adjustment with respect to the angle of the galvano-mirror 33a in such a manner that optical beam a is radiated to a position where the first differential amplifier, which subtracts the output of sensor pattern SC from the output of sensor pattern SB, does not produce an output. Likewise, the CPU 10 makes fine adjustment with respect to the angle of the galvano-mirror 33b in such a manner that optical beam k is radiated to a position where the second differential amplifier, which subtracts the output of sensor pattern SD from the output of sensor pattern SC, does not produce an output. The CPU 10 makes fine adjustment with respect to the angle of the galvano-mirror 33c in such a manner that optical beam c is radiated to a position where the third differential amplifier, which subtracts the output of sensor pattern SE from the output of sensor pattern SD, does not produce an output. The CPU 10 makes fine adjustment with respect to the angle of the galvano-mirror 33d in such a manner that optical beam d is radiated to a position where the fourth differential amplifier, which subtracts the output of sensor pattern SF from the output of sensor pattern SE, does not produce an output.

As a result of the fine adjustments, the optical beams a to d are controlled in the manner shown in FIG. 2.

As shown in FIG. 2, the optical beam a emitted from the laser oscillator 31a is scanned across the optical beam position sensor 38 along a scanning line that corresponds to the gap between sensor patterns SB and SC.

The optical beam b emitted from the laser oscillator 31b is scanned across the optical beam position sensor 38 along a scanning line that corresponds to the gap between sensor patterns SC and SD.

The optical beam c emitted from the laser oscillator 31c is scanned across the optical beam position sensor 38 along a scanning line that corresponds to the gap between sensor patterns SD and SE.

The optical beam d emitted from the laser oscillator 31d is scanned across the optical beam position sensor 38 along a scanning line that corresponds to the gap between sensor patterns SE and SF.

Subsequently, the CPU 10 controls the emission of the four optical beams a to d independently of one another, and further controls the positions of the optical beams a to d on the basis of the sensing signals from the sensor patterns S1 and S2 (Step ST6).

After the end of this control, the CPU 10 controls the powers of the optical beams a to d emitted from the laser oscillators 31a to 31d on the basis of the present target power values for printing (second control values) stored in the memory 11 (Step ST7).

A description will now be given with reference to the flowchart shown in FIG. 4 as to how beam control processing is performed when a print key (not shown) is depressed.

First of all, the CPU 10 controls the powers of the optical beams a to d emitted from the laser oscillators 31a to 31d, in accordance with the first control values recorded in the memory 11 in Step ST3 (Step ST11). In parallel to this control, the CPU 10 executes offset coarse adjustment (i.e., coarse adjustment that takes offsets into account) so as to confine the four optical beams a to d to the regions between sensor patterns SB, SC, SD, SE and SF (Step ST12).

Subsequently, the CPU 10 executes fine adjustment (i.e., the control of the beam positions in the sub-scanning direction) so as to confine the four beams to the four regions between sensor patterns SB, SC, SD, SE and SF, respectively (Step ST13).

Then, the CPU 10 causes the four beams a to d to be emitted independently of one another, and controls the beam positions in the main scanning direction on the basis of the sensing signals supplied from sensor patterns S1 and S2 (Step ST14).

After the end of this control, the CPU 10 controls the powers of the optical beams a to d emitted from the laser oscillators 31a to 31d, on the basis of the present target power values for printing (second control values) stored in the memory 11 (Step ST15).

Figure 5:
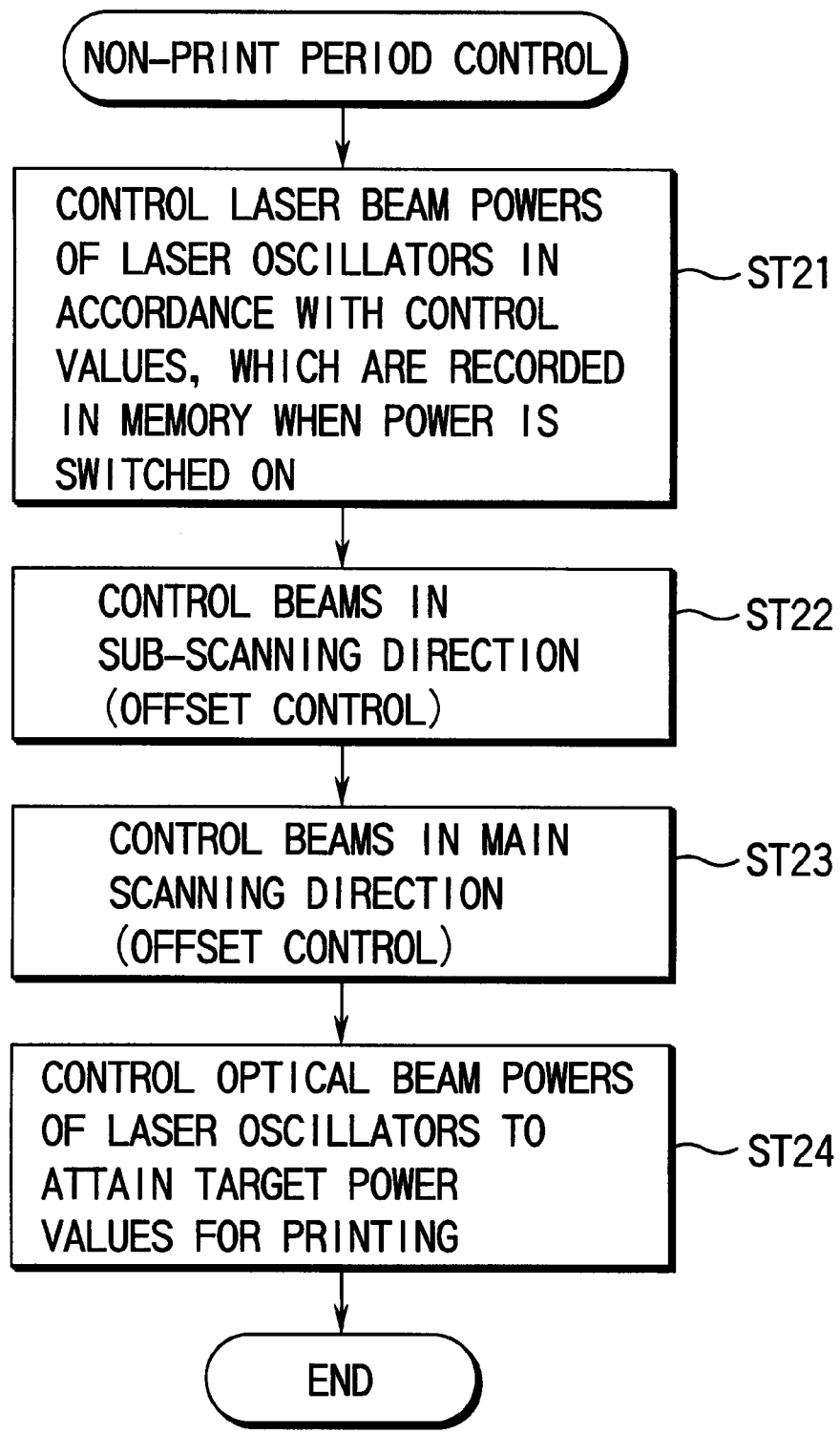
FIG. 5 is a flowchart for illustrating how beam control processing is executed in a period during which no electrostatic latent image is formed on the photosensitive drum (i.e., the period corresponding to the interval between successively-fed print sheets.

A description will now be described with reference to the flowchart shown in FIG. 5 as to how optical beams a to d are controlled in the period when no electrostatic latent image is formed on the photosensitive drum 15, i.e., the period corresponding to the corresponding to the interval between successively-fed print sheets.

First of all, in Step S21, the CPU 10 controls the powers of the optical beams a to d emitted from the laser oscillators 31a to 31d, in accordance with the first control values recorded in the memory 11 in Step ST3. In parallel to this control, the CPU 10 executes one step of the control for controlling the positions of the four optical beams a to d in the sub-scanning direction, i.e., the control for causing the optical beams a to d to be located in the regions between sensor patterns SB, SC, SD, Se and SF (Step ST22).

Subsequently, the CPU 10 controls the emission of the four optical beams a to d independently of one another, and further executes one step of the control for controlling the positions of the optical beams a to d in the main scanning direction on the basis of the sensing signals from the sensor patterns S1 and S2 (Step ST23).

After the end of this control, the CPU 10 controls the powers of the optical beams a to d emitted from the laser oscillators 31a to 31d, on the basis of the present target power values for printing (second control values) stored in the memory 11 (Step ST24).

The control processing from steps ST21 to step ST24 may be repeated an arbitrary number of times, as long as the time corresponds to the interval between the successively-fed print sheets.

As described above, according to the present invention, the timing control of optical beams (i.e., the control of the beam positions in the main scanning direction) and the beam amount control of the optical beams for position control (i.e., the control of the beam positions in the sub-scanning direction) are performed independently of the control of the amount of optical beam used for actual printing. Accordingly, the timing control of optical beams and the beam amount control of the optical beams for position control can be performed without reference to the characteristic change which the photosensitive drum may undergo with time.

Even when the powers (second powers) of the optical beams incident on the photosensitive drum increase due to the characteristics change of the photosensitive drum or for some other reason, this power increase does not adversely affect the timing control of optical beams, nor does it vary the powers (first powers) of the optical beams which are incident on the optical beam sensor at the time of position control. Since, therefore, the first powers remain constant at all times, the sensing signals output from the optical beam sensor do not vary undesirably. Consequently, the timing control and position control of optical beams can be performed accurately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus which scans a plurality of optical beams over an image bearer to form an image on the image bearer by exposure, said apparatus comprising:

a plurality of optical beam generating means for outputting the optical beams;

scanning means for scanning the optical beams over the image bearer by reflecting the optical beams emitted from the optical beam generating means toward the image bearer;

optical beam sensing means, arranged near a beam scanned region of the image bearer, for outputting a sensing signal corresponding to timings at which the scanning means scans the optical beams in a scanning direction, a sensing signal corresponding to power of each of the optical beams, and a sensing signal corresponding to a position determined in a direction orthogonal to the scanning direction;

changing means for changing power of each of the optical beams emitted from the optical beam generating means, independently of one another;

first setting means, operating when the timings at which the scanning means scans the optical beams in the scanning direction and the position determined in the direction orthogonal to the scanning direction are adjusted, for causing the changing means to change the power of each of the optical beams output from the optical beam generating means independently of one another on the basis of the sensing signal corresponding to the power of each of the optical beams from the optical beam sensing means, and for setting the power of each of the optical beams incident on the optical beam sensing means to be first power, which is constant without reference to a characteristic change said image bearer may undergo with time; and second setting means, operating when the image is formed on the image bearer, for causing the changing means to change the power of each of the optical beams output from the optical beam generating means independently of one another on the basis of the sensing signal corresponding to the power of each of the optical beams from the optical beam sensing means, and for setting the power of each of the optical beams incident on the optical beam sensing means to be second power, which is greater than the first power and which gradually increases therefrom in accordance with the characteristic change said image bearer may undergo with time.

2. An image forming apparatus according to claim 1, further comprising adjusting means for adjusting both the timings at which the optical beams are scanned in the scanning direction and the position determined in the direction orthogonal to the scanning direction, on the basis of the sensing signal corresponding to the timings at which the optical beams are scanned in the scanning direction and the sensing signal corresponding to a position determined in the direction orthogonal to the scanning direction, said adjustment makes adjustment in a state where the first power is set by the first setting means.

3. An image forming apparatus according to claim 1, further comprising image forming means for forming an image on the image bearer by exposing the image bearer to the optical beams emitted from the optical beam generating means and scanned over the image bearer, said image forming means forming the image in a state where the second power is set by the second setting means.

4. An image forming apparatus which scans a plurality of optical beams over an image bearer to form an image on the image bearer by exposure, said image forming apparatus comprising:

optical beam generating means for outputting the optical beams;

scanning means for scanning the optical beams over the image bearer by reflecting the optical beams emitted from the optical beam generating means toward the image bearer;

optical beam sensing means, arranged near a to-be-scanned region of the image bearer, for outputting a sensing signal corresponding to timings at which the scanning means scans the optical beams in a scanning direction, a sensing signal corresponding to power of each of the optical beams, and a sensing signal corresponding to a position determined in a direction orthogonal to the scanning direction;

changing means for changing power of each of the optical beams emitted from the optical beam generating means, independently of one another;

first setting means for causing the changing means to change the power of each of the optical beams output from the optical beam generating means independently of one another on the basis of the sensing signal corresponding to the power of each of the optical beams from the optical beam sensing means, and for setting the power of each of the optical beams incident on the optical beam sensing means to be first power, which is constant without reference to a characteristic change said image bearer may undergo with time;

adjusting means, operating when the first power is set by the first setting means, for adjusting the timings at which the optical beams are scanned in the scanning direction and the position determined in the direction orthogonal to the scanning direction, on the basis of the sensing signal corresponding to the timings at which the optical beams are scanned in the scanning direction and the sensing signal corresponding to the position determined in the direction orthogonal to the scanning direction; and second setting means, operating after adjustment is made by the adjusting means, for causing the changing means to change the power of each of the optical beams output from the optical beam generating means independently of one another on the basis of the sensing signal corresponding to the power of each of the optical beams from the optical beam sensing means, and for setting the power of each of the optical beams incident on the image bearer to be second power, which is greater than the first power and which gradually increases therefrom in accordance with the characteristic change said image bearer may undergo with time.

5. An image forming apparatus according to claim 4, wherein said first setting means, said adjusting means and said second setting means operate in the order mentioned, when a power supply is switched on.

6. An image forming apparatus according to claim 4, wherein said first setting means, said adjusting means and said second setting means operate in the order mentioned, during an interval between an operation of forming one image on the image bearer and an operation of forming a subsequent image on the image bearer.

7. An image forming apparatus according to claim 4, wherein said first setting means, said adjusting means and said second setting means operate in the order mentioned, before an image is formed on the image bearer.

* * * * *